(12) United States Patent
Jiang et al.

(10) Patent No.: US 10,337,438 B2
(45) Date of Patent: Jul. 2, 2019

(54) PUSH-BUTTON START SYSTEM FAULT DIAGNOSIS

(71) Applicant: GM GLOBAL TECHNOLOGY OPERATIONS LLC, Detroit, MI (US)

(72) Inventors: Shengbing Jiang, Rochester Hills, MI (US); Scott A. McCullough, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 470 days.

(21) Appl. No.: 14/872,923

(22) Filed: Oct. 1, 2015

(65) Prior Publication Data

US 2017/0096958 A1  Apr. 6, 2017

(51) Int. Cl.
*F02D 41/22* (2006.01)
*F01N 11/00* (2006.01)
(Continued)

(52) U.S. Cl.
CPC ............ *F02D 41/221* (2013.01); *B60R 25/04* (2013.01); *F01N 11/00* (2013.01);
(Continued)

(58) Field of Classification Search
CPC ......... F02N 2200/00; F02N 2200/0808; F02N 2200/062; F02N 2200/06; F02N 2200/061;
(Continued)

(56) References Cited

U.S. PATENT DOCUMENTS 4,050,297 A * 9/1977 Pettingell ............. G01M 15/05
                                                    73/114.59
6,163,271 A * 12/2000 Yoshizawa ............. B60R 25/24
                                                    340/5.26
(Continued)

FOREIGN PATENT DOCUMENTS

CN    104648147 A    5/2015
CN    104847561 A    8/2015

OTHER PUBLICATIONS

Larry Carley, Tech Feature: Diaganosing Push Button Keyless Start Systems, Jun. 13, 2011.*
(Continued)

*Primary Examiner* — Hung Q Nguyen
*Assistant Examiner* — Xiao En Mo
(74) *Attorney, Agent, or Firm* — Cantor Colburn LLP

(57) ABSTRACT

A method for diagnosing a no-start fault of a vehicle push-button start system including a push-button switch, where the system starts a vehicle engine if the switch is pressed and a vehicle brake is applied. The method includes detecting that a no engine crank condition has occurred if the switch is pressed and the brake is applied, and if so, performs a no crank diagnosis. The method also includes determining that a starter control relay has not been enabled after the system is in a crank power mode, and if so, performs a starter not-enabled diagnosis. The method also includes determining that the starter control relay has been disabled before the engine is running, and if so, performs a start disable diagnosis. The method also includes determining that the engine has stalled within some minimum time after it has successfully been started, and if so, performs an engine stall diagnosis.

28 Claims, 6 Drawing Sheets

(51) Int. Cl.
  *F02N 11/08* (2006.01)
  *B60R 25/04* (2013.01)
  *F02N 11/10* (2006.01)
(52) U.S. Cl.
  CPC ........ *F02N 11/0803* (2013.01); *F02N 11/108* (2013.01); *F02D 2041/228* (2013.01); *F02N 11/0822* (2013.01); *F02N 2200/102* (2013.01); *F02N 2300/2011* (2013.01)
(58) Field of Classification Search
  CPC .............. F02N 11/0811; F02N 11/0807; F02N 11/0848; F02N 11/108; F02N 2200/102; F02N 2250/06; F02N 2300/2011
  See application file for complete search history.

(56) References Cited

U.S. PATENT DOCUMENTS

| | | | | |
|---|---|---|---|---|
| 6,351,703 | B1* | 2/2002 | Avery, Jr. | B60R 25/04 123/179.2 |
| 6,573,615 | B1* | 6/2003 | Asakura | B60R 25/04 307/10.2 |
| 6,577,934 | B2* | 6/2003 | Matsunaga | G07C 5/008 340/12.13 |
| 7,702,451 | B1* | 4/2010 | Crossley | F02N 11/0811 123/179.2 |
| 7,920,944 | B2* | 4/2011 | Gould | G07C 5/008 340/425.5 |
| 8,000,864 | B2* | 8/2011 | Rains | F16H 61/0202 180/337 |
| 8,001,944 | B2* | 8/2011 | Yagyu | B60R 25/045 123/179.3 |
| 8,239,094 | B2* | 8/2012 | Underdal | G06Q 10/0631 701/29.4 |
| 8,346,461 | B2* | 1/2013 | Moessner | F02N 11/0848 123/179.22 |
| 8,482,140 | B2* | 7/2013 | Yu | F02N 11/087 123/179.3 |
| 8,996,230 | B2* | 3/2015 | Lorenz | G06F 17/00 701/29.1 |
| 9,624,890 | B2* | 4/2017 | Koenen | F02N 11/0803 |
| 2002/0017260 | A1* | 2/2002 | Saito | F02N 11/0851 123/179.3 |
| 2002/0144667 | A1* | 10/2002 | Ito | F01P 11/20 123/179.3 |
| 2002/0166529 | A1* | 11/2002 | Kawakami | F02N 11/08 123/179.3 |
| 2003/0062987 | A1* | 4/2003 | Funayose | B60R 25/04 340/5.54 |
| 2003/0150416 | A1* | 8/2003 | Flick | B60R 16/03 123/179.2 |
| 2003/0158638 | A1* | 8/2003 | Yakes | A62C 27/00 701/22 |
| 2005/0236900 | A1* | 10/2005 | Kahara | F02N 11/087 307/10.1 |
| 2005/0247280 | A1* | 11/2005 | Asada | F02N 11/0803 123/179.3 |
| 2006/0157023 | A1* | 7/2006 | Matsuki | B60K 25/02 123/339.16 |
| 2006/0244626 | A1* | 11/2006 | Beyene | F02N 11/0807 340/6.1 |
| 2006/0258508 | A1* | 11/2006 | Tanioka | B60R 25/04 477/203 |
| 2007/0056792 | A1* | 3/2007 | Hildebrand | B60R 25/045 180/287 |
| 2007/0084430 | A1* | 4/2007 | Hatayama | F02D 41/009 123/179.14 |
| 2007/0093948 | A1* | 4/2007 | Sago | B60W 50/0205 701/32.7 |
| 2007/0106441 | A1* | 5/2007 | Ono | B60W 10/06 701/36 |
| 2007/0200667 | A1* | 8/2007 | Matsubara | B60R 25/04 340/5.64 |
| 2007/0227489 | A1* | 10/2007 | Ando | B60R 25/04 123/179.3 |
| 2007/0246012 | A1* | 10/2007 | Ando | F02D 41/009 123/406.13 |
| 2007/0257769 | A1* | 11/2007 | Matsubara | B60R 25/04 340/5.61 |
| 2008/0109150 | A1* | 5/2008 | Pfohl | F02N 11/105 701/113 |
| 2008/0281506 | A1* | 11/2008 | Washio | F02N 11/0848 701/113 |
| 2009/0045912 | A1* | 2/2009 | Sakamoto | B60R 25/045 340/5.64 |
| 2009/0192700 | A1* | 7/2009 | Votoupal | F02N 11/10 701/113 |
| 2009/0241884 | A1* | 10/2009 | Saitoh | F02N 11/0825 123/179.4 |
| 2009/0309530 | A1* | 12/2009 | Shin | F02N 11/0859 318/490 |
| 2010/0057332 | A1* | 3/2010 | Katoh | F02N 11/0803 701/113 |
| 2010/0175656 | A1* | 7/2010 | Doub | F02N 11/10 123/179.3 |
| 2010/0282200 | A1* | 11/2010 | Notani | F02N 11/0844 123/179.3 |
| 2010/0299053 | A1* | 11/2010 | Okumoto | F02N 11/0855 701/113 |
| 2011/0056450 | A1* | 3/2011 | Notani | F02N 11/0855 123/179.4 |
| 2011/0074575 | A1* | 3/2011 | Flick | F02N 11/0807 340/540 |
| 2011/0109432 | A1* | 5/2011 | Kim | B60R 25/00 340/5.64 |
| 2011/0118961 | A1* | 5/2011 | Koenen | B60K 28/04 701/113 |
| 2011/0146609 | A1* | 6/2011 | Enoki | F02N 11/0818 123/179.3 |
| 2011/0148566 | A1* | 6/2011 | Ledendecker | B60R 25/04 340/3.1 |
| 2011/0208413 | A1* | 8/2011 | Ko | B60R 25/045 701/113 |
| 2011/0218729 | A1* | 9/2011 | Takahashi | F02N 11/08 701/113 |
| 2012/0133500 | A1* | 5/2012 | Yu | F02N 11/0818 340/455 |
| 2012/0271508 | A1* | 10/2012 | Kanemoto | F02N 11/0825 701/33.6 |
| 2013/0184970 | A1* | 7/2013 | Kanafani | F02D 35/00 701/103 |
| 2013/0220256 | A1* | 8/2013 | Kanemoto | F02N 11/0825 123/179.4 |
| 2013/0297191 | A1* | 11/2013 | Gibson | F02N 11/0855 701/112 |
| 2013/0305081 | A1* | 11/2013 | Agnihotram | G06F 11/0793 714/2 |
| 2014/0032037 | A1* | 1/2014 | Lott | F02N 11/0825 701/29.2 |
| 2014/0095057 | A1* | 4/2014 | Takahashi | F02D 41/042 701/112 |
| 2014/0191513 | A1* | 7/2014 | Kees | F02N 11/006 290/38 R |
| 2014/0266659 | A1* | 9/2014 | Dwyer | A01D 34/6818 340/438 |
| 2014/0345555 | A1* | 11/2014 | Koenen | F02N 11/0803 123/179.3 |
| 2014/0350775 | A1* | 11/2014 | Yagi | G07C 5/008 701/31.4 |
| 2014/0372013 | A1* | 12/2014 | Shimizu | F02N 11/08 701/112 |
| 2014/0379184 | A1* | 12/2014 | Kim | F02N 11/108 701/22 |
| 2015/0032326 | A1* | 1/2015 | Fushiki | B60K 6/365 701/32.1 |
| 2015/0142260 | A1* | 5/2015 | Kim | G01M 15/042 701/34.4 |
| 2015/0159613 | A1* | 6/2015 | Jensen | B60W 30/18018 701/68 |

(56) References Cited

U.S. PATENT DOCUMENTS

| | | | | |
|---|---|---|---|---|
| 2015/0167617 A1* | 6/2015 | Fujita | ................. | F02N 11/0859 701/113 |
| 2015/0178997 A1* | 6/2015 | Ohsaki | ................. | G07C 5/00 701/29.1 |
| 2015/0211469 A1* | 7/2015 | Ghoneim | ................. | F02N 11/0825 701/113 |
| 2015/0252770 A1* | 9/2015 | Books | ................. | B60W 20/40 701/22 |
| 2015/0274098 A1* | 10/2015 | Bolger | ................. | B60R 16/033 307/10.6 |
| 2015/0322912 A1* | 11/2015 | Takizawa | ................. | F02N 11/0837 701/65 |
| 2015/0332526 A1* | 11/2015 | Kurnik | ................. | G07C 5/085 701/31.7 |
| 2015/0361941 A1* | 12/2015 | Du | ................. | F02N 11/108 702/33 |
| 2016/0023660 A1* | 1/2016 | Yu | ................. | B60T 7/122 477/188 |
| 2016/0032858 A1* | 2/2016 | Kim | ................. | F02D 41/042 701/102 |
| 2016/0032880 A1* | 2/2016 | Lovett | ................. | F02N 11/0803 701/22 |
| 2016/0203654 A1* | 7/2016 | Nishino | ................. | G07C 5/08 701/33.4 |
| 2016/0217024 A1* | 7/2016 | Nomura | ................. | G06F 11/079 |
| 2016/0273975 A1* | 9/2016 | Tano | ................. | G01K 15/007 |
| 2016/0290304 A1* | 10/2016 | Yukawa | ................. | F02N 11/04 |
| 2016/0297415 A1* | 10/2016 | Kato | ................. | B60W 30/18118 |
| 2016/0298559 A1* | 10/2016 | Matsushita | ................. | F02N 11/0862 |
| 2016/0305389 A1* | 10/2016 | Kato | ................. | B60T 7/10 |
| 2016/0368507 A1* | 12/2016 | Geissenhoner | ................. | F02N 11/0807 |
| 2016/0377014 A1* | 12/2016 | Books | ................. | F02N 11/0848 123/179.14 |
| 2017/0058853 A1* | 3/2017 | Nagata | ................. | F02N 11/108 |

OTHER PUBLICATIONS

"Diagnotic flowchart for a car that won't start or stalls"; Copyright 206 by Morris Rosenthal All Rights Reserved; CPME164715; May 16, 2018; http://www.ifitjams.com/starting.htm; 7 pgs.

Chinese Office Action for Application No. 20610848225.1 dated Jun. 5, 2018; 7 pgs.

* cited by examiner

PUSH-BUTTON START SYSTEM FAULT DIAGNOSIS

BACKGROUND OF THE INVENTION

Field of the Invention

This invention relates generally to a system and method for diagnosing faults when a vehicle push-button start system has failed and, more particularly, to a system and method for diagnosing faults when a vehicle push-button start system has failed, where the method includes monitoring the start sequence, identifying and recording fault information detected at key steps during the sequence, if any, and using the information during a no-start diagnosis.

Discussion of the Related Art

Some modern vehicles include a push-button engine start system where the vehicle operator will push a start/stop button inside of the vehicle to start the vehicle engine instead of the traditional rotating a key in a key ignition switch. When a vehicle operator pushes the start/stop button, various systems are activated in sequence in a controlled operation to ensure that the vehicle driver is authorized to start the vehicle and to perform various control and security steps for safety purposes and otherwise. One of the start conditions typically includes providing an automatic wireless communications with a fob carried by the vehicle operator that identifies the operator as an authorized user.

As with all vehicle systems, the push-button start system may fail when an authorized user pushes the start/stop button and the vehicle engine does not start. In response to such a start failure, the vehicle operator may take the vehicle to a service technician who will typically connect a diagnostic tool to the vehicle in an effort to identify the specific fault that is causing the start failure. Certain component faults and failures on a vehicle cause a diagnostic trouble code (DTC) to be issued that is stored in a vehicle controller and can be downloaded by the diagnostic tool to identify the fault associated with the DTC.

The current techniques for diagnosing a no-start failure in these types of vehicle push-button start systems does not link specific DTCs to the start sequence and control operation of the system. More specifically, DTCs are generally specific to a component on the vehicle, and may only identify certain types of faults, such as a short-to-ground or short-to-power failure, of the component. However, because the start sequence of a push-button start system is generally complex and involves a number of vehicle components and operations, it is often times difficult and time consuming to identifying a fault causing the start failure. For example, the push-button start system will look for a number of conditions that need to be satisfied in order for the vehicle engine to be started. Sometimes these conditions are not related to a specific component, and thus if the condition is not satisfied and there is no component failure, a DTC may not be issued. Hence, the service technician may connect the diagnostic tool to the vehicle and not be able to identify a specific fault by a DTC. In those cases, the service technician generally relies on experience and trial and error to replace and/or test different things on the vehicle to identify what is causing the no-start condition. Further, sometimes failures in the push-button start system are intermittent, where the vehicle engine may start sometimes and not start other times as a result of a loose wire or other type of failure on the vehicle, where the technician is required to identify the failure without the failure actually occurring at that particular time.

SUMMARY OF THE INVENTION

The following discussion discloses and describes a system and method for diagnosing a no-start fault of a vehicle push-button start system including a push-button switch, where the start system starts a vehicle engine if the switch is pressed and a vehicle brake is applied. The method includes detecting that a no engine crank condition has occurred if the switch is pressed and the brake is applied, and if so, performs a no crank diagnosis. The method also includes determining that a starter control relay has not been enabled after the system is in a crank power mode, and if so, performs a starter not-enabled diagnosis. The method also includes determining that the starter control relay has been disabled before the engine is running, and if so, performs a start disable diagnosis. The method also includes determining whether the engine has stalled within some minimum time after it has successfully been started, and if so, performs an engine stall diagnosis. Each of the no crank diagnosis, starter not-enabled diagnosis, starter disabled diagnosis and engine stall diagnosis include reading DTCs, parameter identification (PID) values, signal values in electronic control unit memories, bus messages, etc.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for monitoring a vehicle push-button start system sequence and recording and identifying failures and faults during the sequence, if any, and using the information during a no-start diagnosis is merely exemplary in nature, and is in no way intended to limit the invention or its applications or uses.

Figure 1:
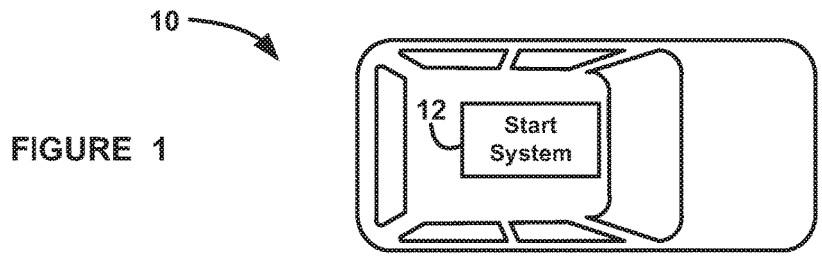
FIG. 1 is an illustration of a vehicle including a push-button start system.
Figure 2:
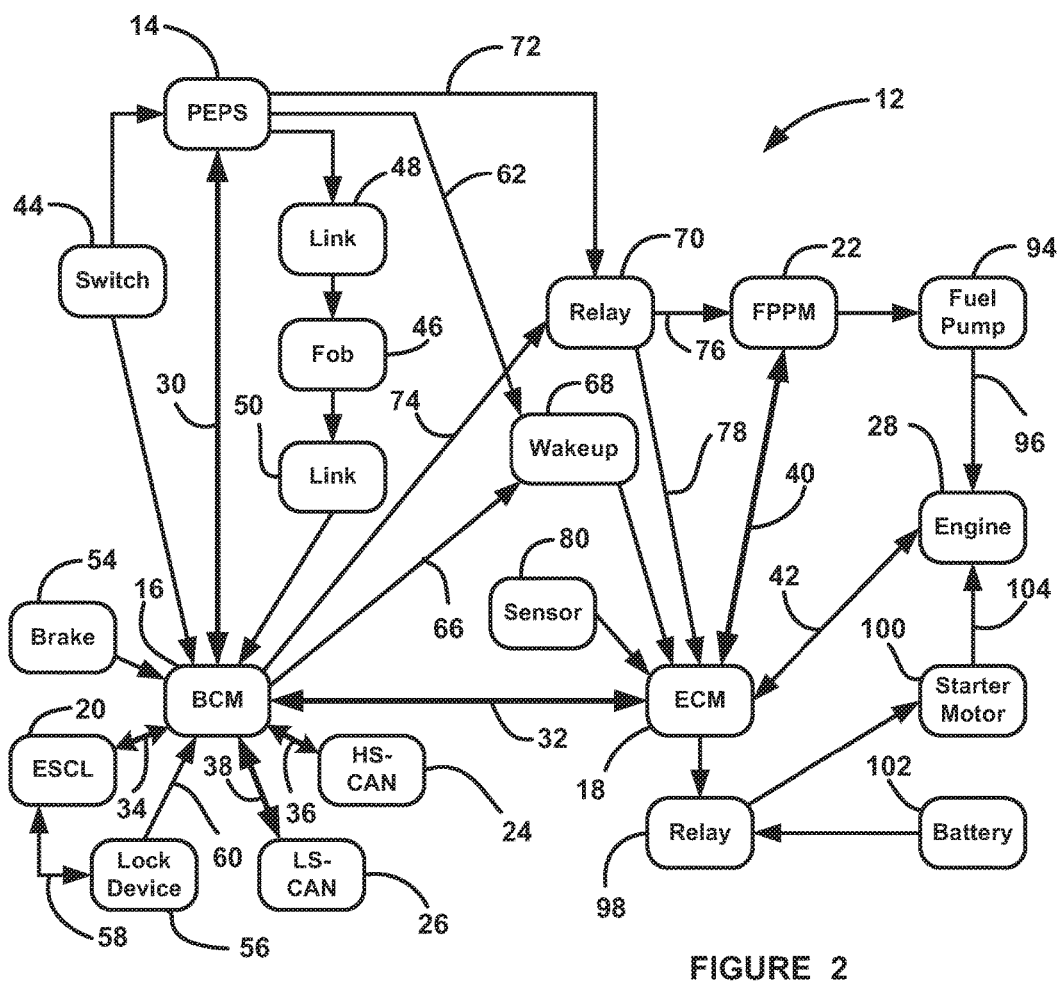
FIG. 2 is a schematic block diagram of the push-button start system.

FIG. 1 is an illustration of a vehicle 10 including a push-button engine start system 12 and FIG. 2 is a schematic block diagram of the push-button start system 12. The system 12 includes a number of electronic control units (ECUs) that are programmed and operate to control certain parts of the vehicle 10 whose operation is typically specific to a certain vehicle type or model. Some of these ECUs also provide certain operations during the starting sequence of the push-button start system 12, where the general operation of these ECUs is well known to those skilled in the art and the more specific use of those ECUs for the start-up system 12 will be discussed in further detail below.

The ECUs in the system 12 include a passive entry passive start (PEPS) module 14, a body control module (BCM) 16, an engine control module (ECM) 18, an electrical steering column lock (ESCL) module 20, a fuel pump power module (FPPM) 22, high speed controller area network (HS-CAN) environment ID slave modules 24, and low speed controller area network (LS-CAN) environment ID slave modules 26. Examples of the modules 24 include anti-lock brake system modules and examples of the modules 26 include instrument panel cluster modules, HVAC modules and sensing and diagnostic modules. In this exemplary design, the PEPS module 14 and the BCM 16 send signals and messages to each other on a low speed CAN bus 30, the BCM 16 and the ECM 18 send signals and messages to each other on a high speed CAN bus 32, the BCM 16 and the ESCL module 20 send messages and signals to each other on a low speed CAN bus 34, the HS-CAN environment ID slave modules 24 and the BCM 16 send signals and messages to each other on a high speed CAN bus 36, the BCM 16 and the LS-CAN environment ID slave modules 26 send signals and messages to each other on a low speed CAN bus 38, and the ECM 18 and the FPPM 22 send signals and messages to each other on a high speed CAN bus 40. Further, the ECM 18 sends signals to and receives signals from a vehicle engine 28 on line 42.

The system 12 also includes a push-button stop/start switch 44 in communication with both the PEPS module 14 and the BCM 16, and a fob 46 that is typically carried by the vehicle operator, where the fob 46 is in low frequency wireless communications with the PEPS module 14 on communications link 48 and is in radio frequency wireless communications with the BCM 16 on communications link 50. The position of a brake 54 on the vehicle 10 is sent to the BCM 16 by a suitable sensor and a steering column lock device 56, such as a locking bolt, that locks the steering column on the vehicle 10 is controlled by the ESCL module 20 on line 58, where a signal identifying its lock or unlock position is sent to the BCM 16 on line 60. Further, the system 12 includes a park/neutral position sensor 80 that provides a gear position to the ECM 18 so that the vehicle 10 will not be started if it is in gear.

The BCM 16 controls the power mode of the vehicle 10 for the system 12 and otherwise, where the power modes include an off mode, an accessory power mode that uses battery power, a crank power mode for cranking the vehicle 10 for starting purposes, and a run power mode for running the vehicle 10 after the vehicle 10 has started. In one embodiment, the BCM 16 runs a power mode algorithm known as the power mode master. In order for the vehicle 10 to be put in the crank power mode and started, the brake 54 need to be pressed while the switch 44 is being pushed, where pressing of the switch 44 is detected by the PEPS module 14 and the BCM 16, and pressing of the brake 54 is detected by the BCM 16. When the switch 44 and the brake 54 are pressed, the PEPS module 14 and the BCM 16 each send a signal to a run/crank relay 70 to put the relay 70 on, and the BCM 16 notifies the ECM 18 of a request for the crank power mode. The output of the relay 70 is provided to the FPPM 22 on line 76 and to the ECM 18 on line 78. Once the engine 28 has started, the power mode is switched to the run power mode by the BCM 16, which knows the engine 28 has started by a signal from the ECM 18. If the vehicle operator wishes to put the vehicle 10 in the accessory power mode provided by battery power, the vehicle operator does not press the brake 54, but only presses the switch 44. The PEPS module 14 and the BCM 16 both recognize this power mode request, and each sends a signal to an accessory wakeup box 68 for requesting the accessory power mode, which notifies the ECM 18 of the request.

The ECM 18 controls starting of the engine 28 by sending messages to the FPPM 22 and a starter control relay 98 when it is time to start the engine 28. The FPPM 22 provides a signal to a fuel pump 94, which provides fuel to the engine 28 on line 96. Further, the starter control relay 98 turns on a starter motor 100 to start the engine 28 by a signal on line 104, where the relay 98 receives power from a vehicle battery 102.

The start-up sequence of the vehicle engine 28 using the system 12 is described as follows. When the vehicle operator pushes the switch 44 a start request signal is received by the PEPS module 14 and the BCM 16. This causes the PEPS module 14 to wirelessly send a challenge to the fob 46 on the low frequency link 48, where the fob 46 sends the answer to the challenge to the BCM 16 on the radio frequency link 50. The PEPS module 14 also sends the challenge to the BCM 16 on the low speed CAN bus 30. If the answer to the challenge received from the fob 46 matches the answer calculated by the BCM 16 based on the challenge provided by the PEPS module 14, the BCM 16 will then proceed to determine whether other operating conditions are satisfied to start the vehicle 10. If the vehicle operator has pressed the brakes 54 and the challenge is verified, the BCM 16 will send a signal on the low speed CAN bus 34 to the ESCL module 20 to unlock the steering column locking device 56, where the unlocked position of the device 56 will be sent to the BCM 16 on the line 60. The BCM 16 will also initiate the crank power mode by sending a signal on the high speed CAN bus 32 to the ECM 18 and a signal to the relay 70 on the line 74. Once the ECM 18 receives the crank power mode request message from the BCM 16, it will check to make sure that the vehicle 10 is in park or neutral by the sensor 80, and if so, and other conditions are satisfied, will send a signal to the starter control relay 98 to provide power from the battery 102 to the starter motor 100. The ECM 18 will also send a signal to the FPPM 22 to provide fuel to the engine 28 through the fuel pump 94. Once the engine 28 is running, it will send a signal to the ECM 18 on the line 92 indicating engine rotation, and the ECM 18 will send a signal to the relay 98 to shut the starter motor 100 off. The ECM 18 will also send a signal to the BCM 16 indicating that the engine 28 is now running and the BCM 16 will change the power mode from the crank power mode to the run power mode.

At the same time that the ECM 18 is going through the starting process of the engine 28 as described it will also go through a verification process with the BCM 16 to ensure that the BCM 16 has authorized the starting of the vehicle 10. In this design, the ECM 18 will send a challenge message on the high speed CAN bus 32 to the BCM 16 and the BCM 16 will verify that there are no unauthorized modules connected to the vehicle 10 that could cause the engine 28 to start without the proper authorization by looking at ID messages from the environment ID slave modules 24 and 26 indicating that there are no unauthorized modules on the vehicle 10. The BCM 16 will respond to the challenge sent by the ECM 18 to verify that the engine start is authorized. During this authentication process, the ECM 18 is providing power to the starter motor 100 to start the engine 28, and if the engine 28 starts before the authentication process is completed, the ECM 18 will shut the engine 28 off if an invalid challenge response message is returned by the BCM 16.

As discussed above, the system 12 goes through a number of operations to ensure that it is proper for the vehicle 10 to be started. These operations can be sifted down to a number of key steps that can be monitored by the system 12 to identify what particular step may have failed if the vehicle operator presses the switch 44 and the brakes 54 and the vehicle 10 does not start. The processes discussed herein may include algorithms that are running in one or both of the BCM 16 and the ECM 18 depending on what specific operation is being performed, and may include recording identification of errors, faults, DTCs, PID values, etc. in the modules 16 and 18 to later be identified if the engine 28 does not start during the start sequence. The processes may also include operations by a service technician who is determining the cause of the start failure. These key steps include identifying that the switch 44 is pushed and the brake 54 are applied, identifying whether the system 12 enters the crank power mode, identifying whether the starter control relay 98 is enabled, identifying whether the engine 28 starts, and if so, identifying whether the system 12 enters the run power mode. The BCM 16 and the ECM 18 monitor the signals on the bus 32 to ensure that these key steps are performed in this sequence so that if some of the steps are performed and not others, the diagnosis operation can limit the areas that are analyzed to identify the fault.

The start-up fault detection diagnosis discussed herein can be separated into four major analysis areas based on the key steps referred to above. The first analysis area determines whether the crank power mode has been entered and can include determining whether the switch 44 has been pressed, the brake 54 have been applied, the fob 46 has been authenticated, the steering column has been successfully unlocked, etc. If the crank power mode has been entered, the next analysis area determines whether the starter control relay 98 has been enabled, and can include determining whether there is a valid engine crank request, whether the immobilizer propulsion system is properly enabled, whether all of the slave modules 24 and 26 are valid, whether there is no engine rotation, etc. If the starter control relay 98 has been enabled, the next analysis area determines whether the starter control relay 98 is disabled before the engine 28 starts, and can include determining whether the engine 28 is running, the vehicle 10 is in gear, there has been an engine shut down sequence enabled, the engine 28 has not started after a minimum crank time, there is no engine rotation, the vehicle operator has pressed the switch 44 to turn the vehicle 10 off, etc. If the starter control relay 98 is not disabled, the next analysis area determines if the engine 28 has stalled shortly after a successful start, and can include determining whether immobilization has been enabled or the engine shut down has been enabled.

Figure 3:
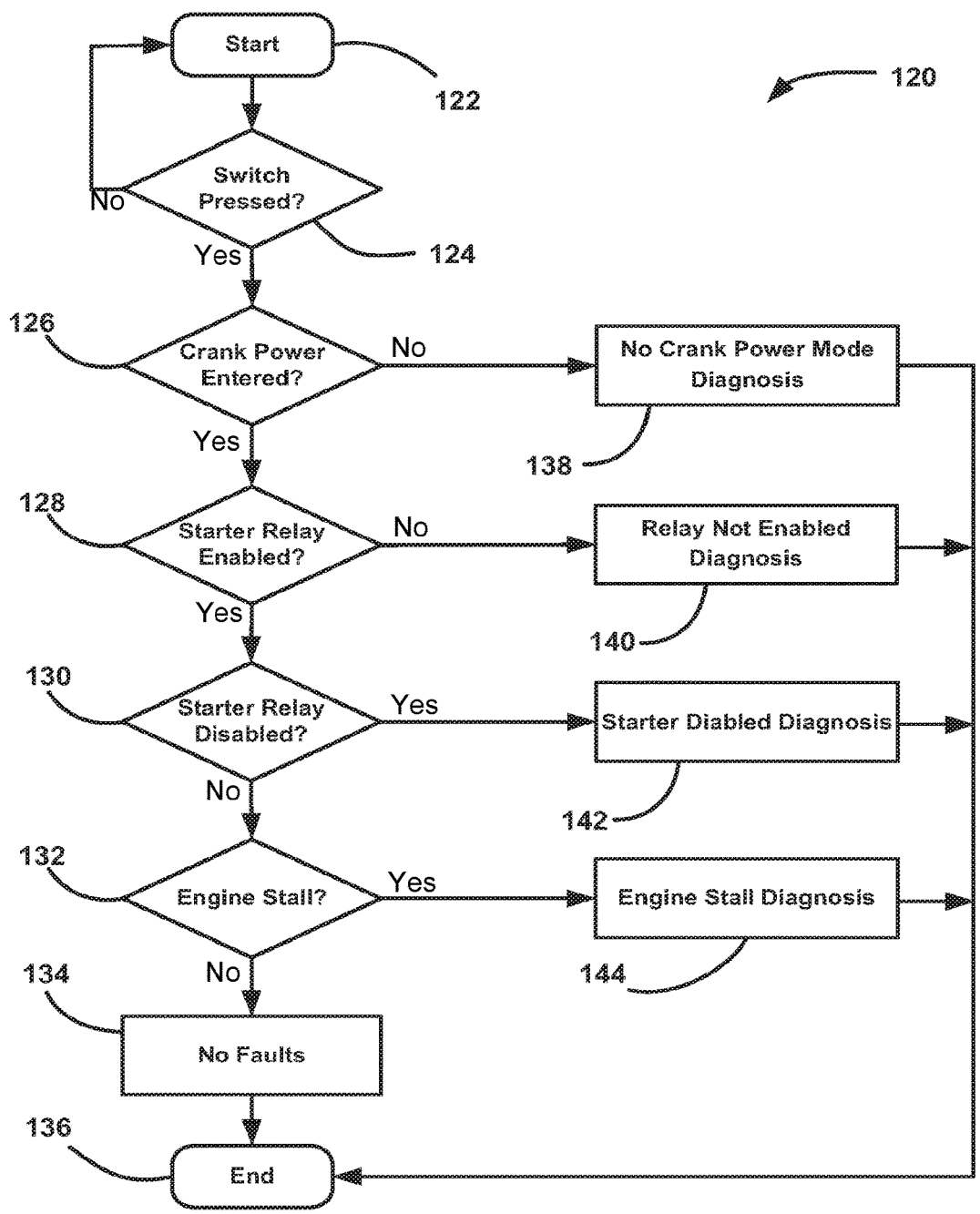
FIG. 3 is a flowchart diagram showing a high level operation for diagnosing a push-button start system failure.

FIG. 3 is a flowchart diagram 120 showing a high level process for diagnosing a push-button start system failure as just discussed. The process begins at box 122 and determines whether the switch 44 has been pressed when the vehicle 10 is in the power off mode at decision diamond 124, and if not, returns to the box 122 to wait for the next sample period. If the switch 44 has been pressed while the vehicle 10 is in the power off mode at the decision diamond 124, the process determines whether the crank power mode has been entered after a predetermined period of time, such as 3 seconds, at decision diamond 126. If the crank power mode has been entered at the decision diamond 126, then the process determines whether the starter control relay 98 has been enabled at decision diamond 128 within a predetermined time after the crank power mode has been entered, such as 3 seconds. If the starter control relay 98 has been enabled at the decision diamond 128, then the process determines whether the starter control relay 98 has been disabled without the engine 28 running at decision diamond 130. If the starter control relay 98 has not been disabled at the decision diamond 130, the process then determines if the engine 28 has stalled without the vehicle operator pressing the switch 44 within some period of time after the engine 28 has started, such as 3 seconds, at decision diamond 132. If the engine 28 has not stalled after a successful start, then the engine 28 should be running and there should be no faults detected at box 134, and the process ends at box 136.

If the crank power mode is not detected after the time threshold at the decision diamond 126, then the process goes into a no crank power mode diagnostic process at box 138 to determine why, such as looking at DTCs, PID values, signal values in the ECU memory and bus messages, etc., and the process ends at the box 136. If the starter control relay 98 has not been enabled within the time threshold at the decision diamond 128, then the process goes into a starter control relay not enabled diagnostic process at box 140 to determine why, such as looking at DTCs, PID values, signal values in the ECU memory and bus messages, etc., and the algorithm ends at the box 136. If the starter control relay 98 is disabled before the engine 28 is running at the decision diamond 130, then the process goes into a starter disabled diagnosis process at box 142 to determine why, such as looking at DTCs, PID values, and signal values in the ECU memory and bus messages, etc., and the algorithm ends at the box 136. If the engine 28 has stalled at the decision diamond 132, then the process goes into an engine stall diagnosis process at box 144 to determine why, such as looking at DTCs, PID values, and signal values in the ECU memory or bus messages, etc., and the process ends at the box 136.

Figure 4:
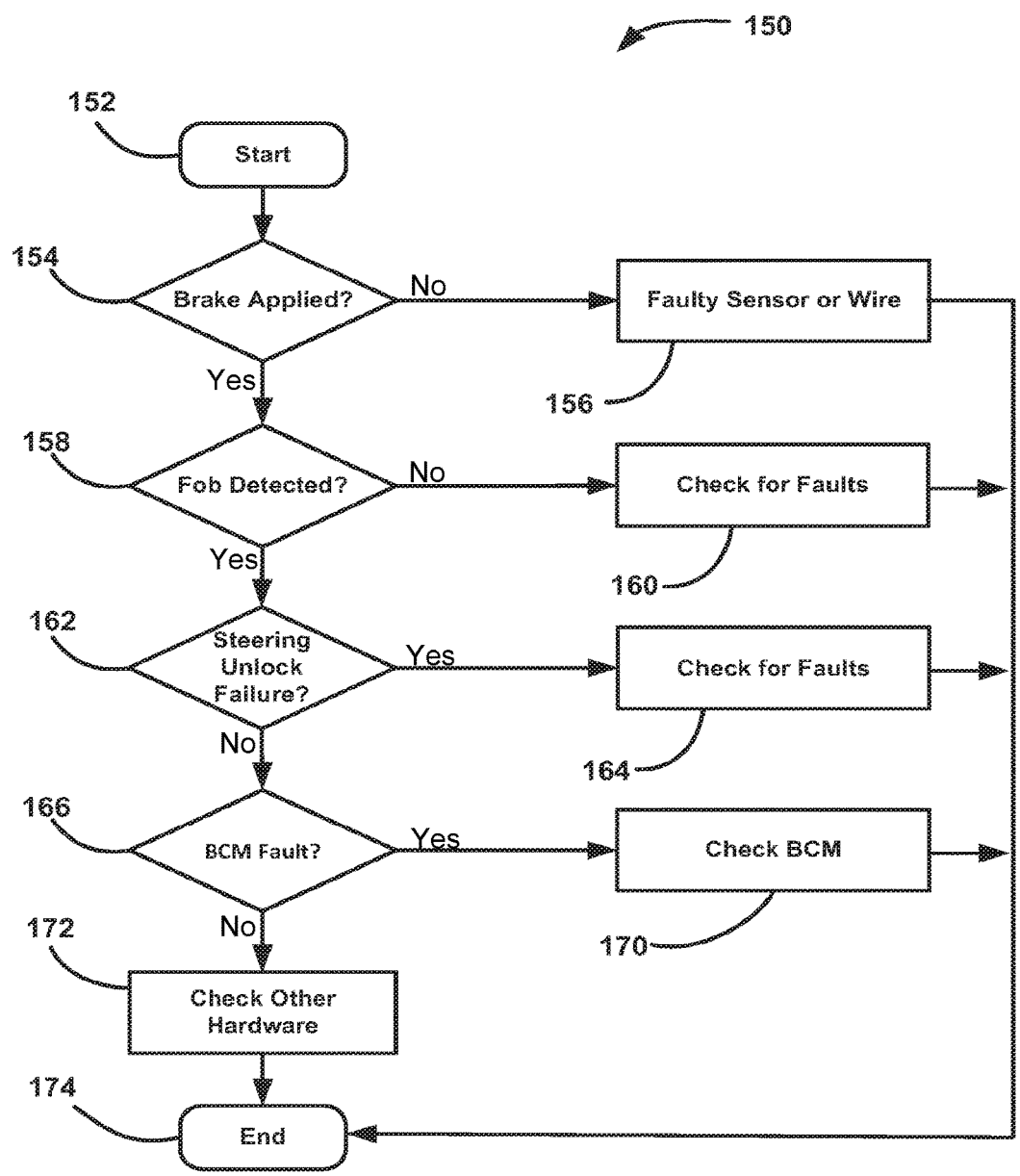
FIG. 4 is a flowchart diagram showing a process for diagnosing a no crank push-button start system failure.

FIG. 4 is a flow chart diagram 150 providing a more detailed discussion of what processes can be performed at the box 138 if it is determined that there is a no crank power mode at the decision diamond 126. The process begins at box 152 and determines if the brake 54 has been applied at decision diamond 154. As discussed above, the BCM 16 receives a signal when the brake 54 has been applied. In addition, the ECM 18, or alternately an electronic brake control module (EBCM), also receives a signal that the vehicle brake 54 has been applied, which is separate from the push-button start sequence discussed above. Therefore, the BCM 16 may not receive a signal that the brake 54 has been pressed, but the ECM 18 or the EBCM may report that the brake 54 has been pressed. Because the BCM 16 does not receive the brake press signal, it will not change the power mode to the crank power mode. Thus, if the BCM 16 does not send a message that the brake 54 has applied, but the ECM 18 reports that the brake 54 has been applied, the technician can look to see if the brake apply sensor or wire is faulty and the associated DTC is present at box 156.

If the BCM 16 reports that the brake 54 has been applied at the decision diamond 154, then the process determines whether the fob 46 has been detected and validated by the BCM 16 at decision diamond 158. If the fob 46 has not been detected or validated at the decision diamond 158, then the process determines whether the challenge has been provided by the PEPS module 14 on the bus 30 if no challenge is provided by the PEPS module 14 on the bus 30, then the process then checks for bus and PEPS module failures and associated DTCs, otherwise it checks for low frequency antenna wire failures on the link 48, checks that the fob 46 is working properly, checks the RF receiver or wire failures on the link 50, checks for BCM faults and associated DTCs and PID values, etc. at box 160.

If the fob 46 has been validated at the decision diamond 158, then the process determines if there has been a steering column unlock failure at decision diamond 162. If the process determines that there has been a steering column unlock failure, then the technician can look for related DTCs for wire or column hardware lock faults, DTCs for relay/coil faults, DTCs for no response from the ESCL 20 or ESCL failure, DTCs for faults from the feedback circuit to the BCM 16, etc. at box 164. If no steering column unlock failure has been detected at the decision diamond 162, then the process determines whether there is a DTC fault of the BCM 16 itself at decision diamond 166. If there is a BCM module fault detected at the decision diamond 166, then the process can check the BCM 16 and its power and ground connections at box 170. If the no crank power mode is detected, but none of the faults associated with the decision diamonds 154, 158, 162 and 166 are identified, then there is no specific root cause recorded by the system 12, and the technician can try other things to determine the fault, such as check the battery 102, the BCM 16 and its power and ground connections, etc. at box 172, where the process ends at box 174.

Figure 5:
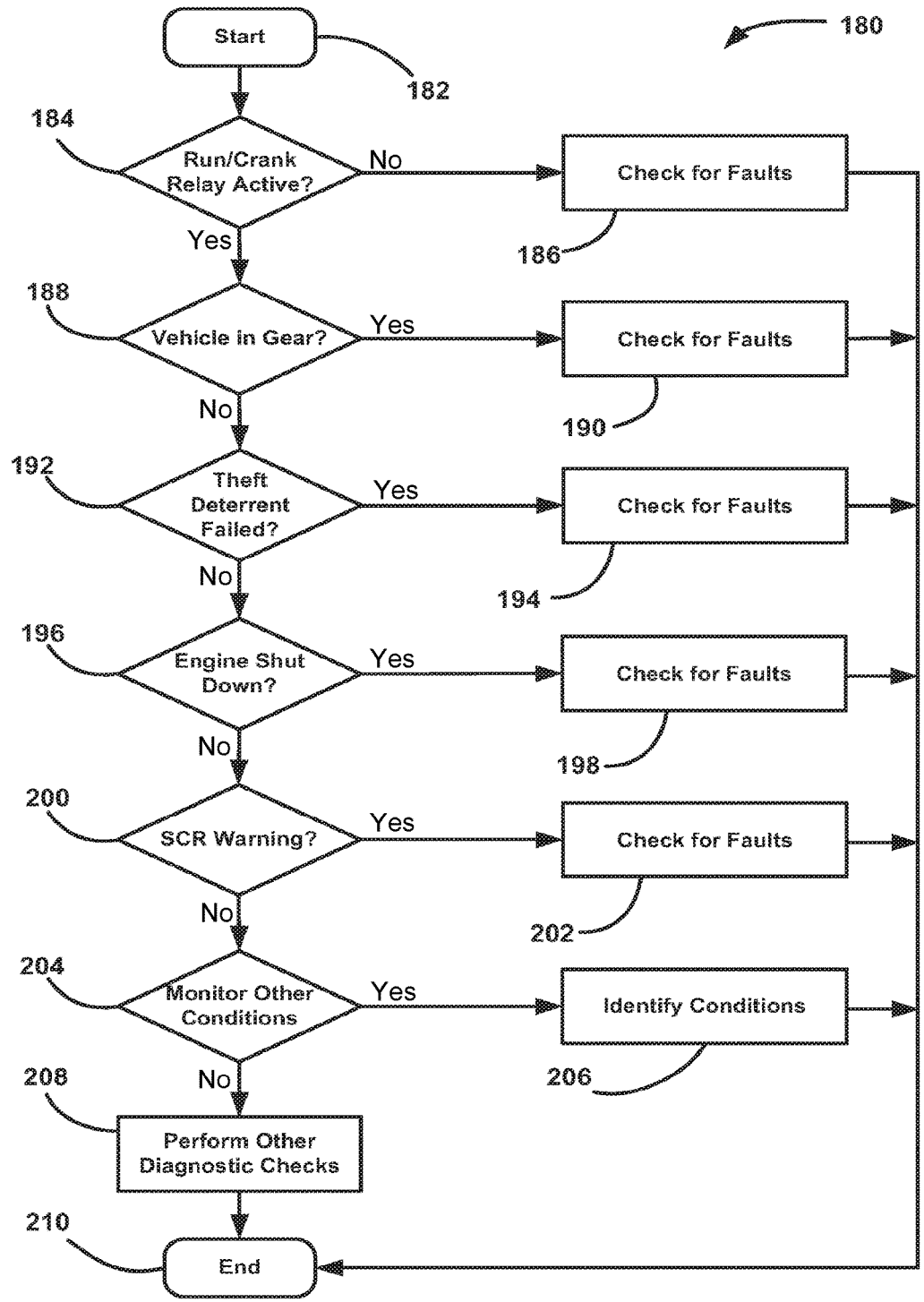
FIG. 5 is a flowchart diagram showing a process for diagnosing a starter not-enabled push-button start system failure.

FIG. 5 is a flow chart diagram 180 providing a more detailed discussion of what processes can be performed at the box 140 if it is determined that the starter control relay 98 has not been enabled at the decision diamond 128. The process begins at box 182 and determines if the run/crank relay 70 is active or operational at decision diamond 184. If the run/crank relay 70 is not active at the decision diamond 184, then the service technician can check to see if the BCM and PEPS module wires to the run/crank relay 70 are faulty, can check that the run/crank relay 70 itself is working, can check the input wires to the ECM 18, etc. at box 186. If the run/crank relay 70 is operating properly at the decision diamond 184, the process can determine whether the ECM 18 is receiving a proper gear signal from the sensor 80 at decision diamond 188. If the ECM 18 is not receiving a proper gear signal at the decision diamond 188, the service technician can check for gear sensor/circuit faults and associated DTCs and PID values at box 190.

If the vehicle 10 is not in gear at the decision diamond 188, the process can determine whether a theft deterrent analysis has failed at decision diamond 192. If the theft deterrent analysis has failed at the decision diamond 192, the process can check for any related DTCs including an incorrect pre-release password, an incorrect immobilization key from the ECM 18, no response from the BCM 16 to the challenge sent to the BCM 16 by the ECM 18, the BCM 16 has not programmed the secret challenge key, all of the authentication codes from the slave modules 24 and 26 are not validated, there has been no request from the ECM 18 for a challenge, etc. at box 194. If the vehicle theft deterrent analysis has not failed at the decision diamond 190, then the process can determine whether the engine 28 has shut down at decision diamond 196. If the engine has shut down at the decision diamond 196 the process can check for corresponding DTCs to identify the failure at box 198. In this situation, if the ECM 18 causes the engine 28 to shut down shortly after start-up, the ECM 18 will record an indication of why that shut down has occurred.

If the engine 28 has not shut down at the decision diamond 196, the process can then determine whether a selective catalytic reduction (SCR) warning from an SCR device has occurred at decision diamond 200, and if so, can determine whether there is a DTC indicating this warning at box 202. It is noted that SCR requirements are typically only necessary for diesel engines. If the SCR warning is not active at the decision diamond 200, then the process monitors any other conditions that may apply to a starter not-enabled fault at decision diamond 204, and if so, identifies the other conditions at box 206, where the other conditions could include ice break mode, engine movement, ignition and crank enabled, etc. If there are no additional or new conditions occurring at the decision diamond 204, then there are no specific root causes recorded by the process for a starter not-enabled condition, and the technician can perform other diagnostic checks, such as check the battery 102, the ECM power and ground connections, etc. at box 208 and the process ends at box 210.

Figure 6:
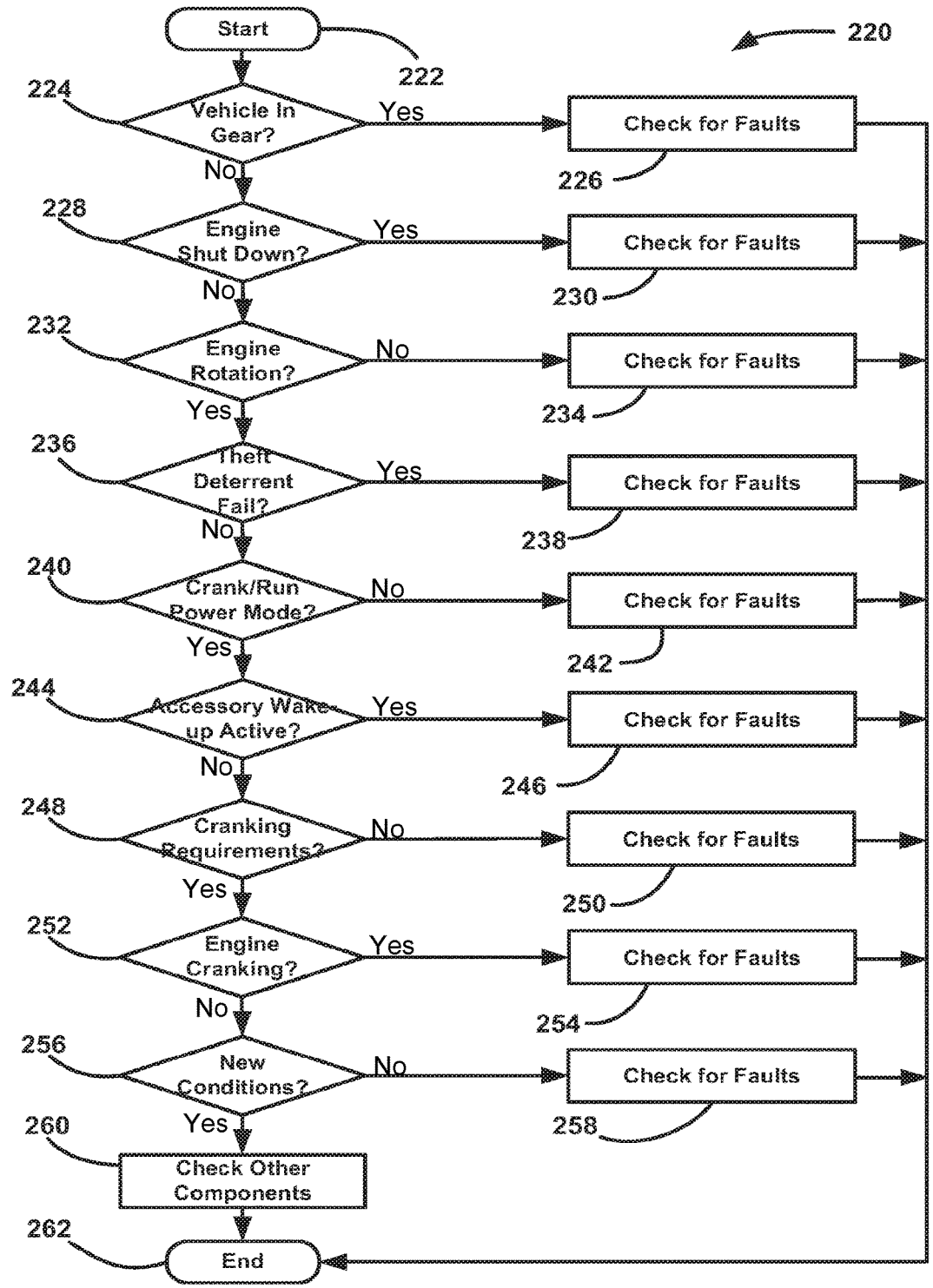
FIG. 6 is a flowchart diagram showing a process for diagnosing a starter disabled push-button start system failure.

FIG. 6 is a flow chart diagram 220 providing a more detailed discussion of what processes can be performed at box 142 if it is determined that the starter control relay 98 has been disabled at the decision diamond 130. The process begins at box 222 and determines whether the vehicle 10 is in gear at decision diamond 224. If the ECM 18 is not receiving a proper gear signal at the decision diamond 224, the service technician can check for gear sensor/circuit faults and associated DTCs and PID values at box 226. If the vehicle 10 is not in gear at the decision diamond 224, the process then determines whether the engine 28 is shut down at decision diamond 228, and if so, checks for corresponding DTCs to identify the failure at box 230. In this situation, if the ECM 18 causes the engine 28 to shut down shortly after start-up, the ECM 18 will record an indication of why that shut down has occurred.

If the engine 28 has not shut down at the decision diamond 228, then the process determines whether there is no engine rotation after a minimum crank time at decision diamond 232, and if so, the technician can check the DTCs for a starter control relay circuit fault, can check the starter control relay 98, motor, solenoid, etc. at box 234. During this process, when the ECM 18 enables the starter motor 100, it monitors the engine 28 on the line 92 to determine whether it is turning or not. If there is engine rotation after a minimum crank time at the decision diamond 232, the process can then determine whether a theft deterrent analysis has failed at decision diamond 236, and if so, the process checks for any cause relating to this failure at box 238. These checks can include observing any related DTCs including an incorrect pre-release password, an incorrect immobilization key from the ECM 18, no response from the BCM 16 to the challenge sent to the BCM 16 by the ECM 18, the BCM 16 has not programmed the secrete challenge key, the authentication codes from all of the slave modules 24 and 26 are not valid, there has been no request from the ECM 18 for a challenge, etc.

If the vehicle theft deterrent determination has not failed at the decision diamond 236, then the process determines whether the ignition input power mode is not in the crank/run power mode after a minimum crank time at decision diamond 240. In other words, the BCM 16 provides signals to the run/crank relay 70 when the system 12 is in the crank power mode. If the crank power mode is not maintained during the start-up procedure, the ECM 18 will stop the start-up procedure, thus indicating a fault. If this occurs, the technician can determine if the wires to and from the BCM 16, the PEPS module 14 and the run/crank relay 70 are faulty and can check the run/crank relay 70 and the relay input wire to the ECM 18 at box 242. If the power mode is in the crank power mode at the decision diamond 240, the process can then determine whether the accessory wake-up signal at the box 68 is active after a predetermined maximum crank time at decision diamond 244. As mentioned, the accessory wake-up signal should not be active during the vehicle start and if it is active, the technician can check the DTCs for wire shorts, check whether the PEPS module 14 or the BCM 16 is faulty, etc. at box 246.

If the accessory wake-up is not active at the decision diamond 244, then the process can determine whether the cranking requirements are proper after an extended crank time at decision diamond 248. The ECM 18 monitors the crank requirements during the vehicle start operation and if there are any errors, stops the vehicle start-up. If the crank requirements are not confirmed at the decision diamond 248, then the process can determine whether the power mode is in the crank power mode, and if so, can check for CAN bus/ECM faults, whether the switch 44 has been pressed, whether BCM faults are present, etc. at box 250. If the crank requirements are confirmed at the decision diamond 248, then the process determines whether engine cranking has occurred for a maximum crank time without the engine 28 starting at the decision diamond 252, and if so, the technician can check the starter system, fuel system, engine system, the battery 102, etc. at box 254. If cranking has not occurred for a maximum period of time at the decision diamond 252, then the process can look at any other additional and/or new conditions to determine why the starter control relay 98 has been disabled at decision diamond 256, and if such conditions are present, perform whatever checks are available for those conditions at box 258. If all of the conditions are satisfied at the decision diamond 256, then the process cannot find a specific root cause recorded by the embedded starting diagnosis for a disabled starter control relay and the service technician can check the battery 102, the ECM 18, all power and ground connections, etc. at box 260, where the process ends at box 262.

Figure 7:
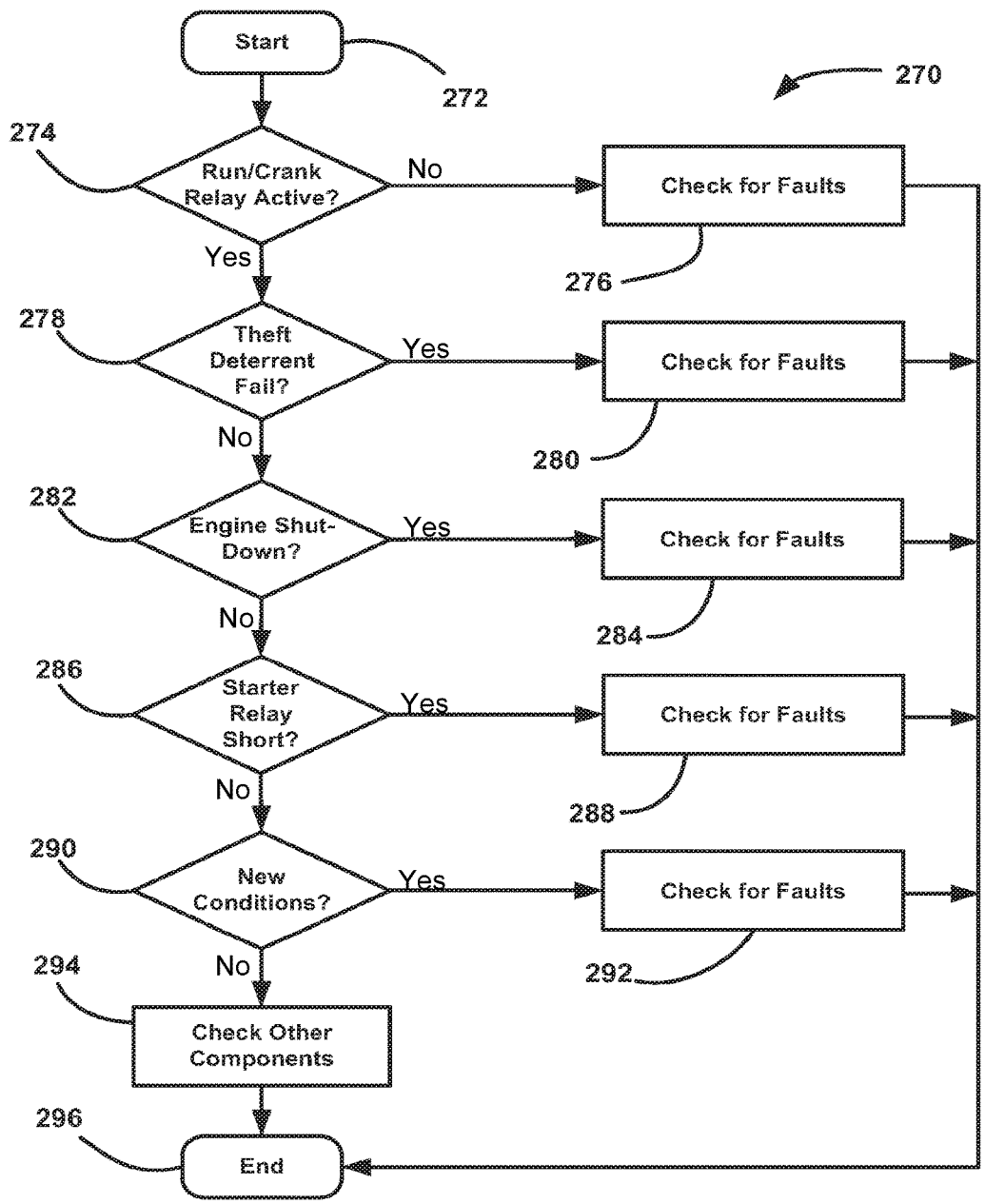
FIG. 7 is a flowchart diagram showing a process for diagnosing an engine stall push-button start system failure.

FIG. 7 is a flow chart diagram 270 providing a more detailed discussion of what processes can be performed at the box 144 if it is determined that the engine 28 has stalled shortly after being started at the decision diamond 132. The process begins at box 272 and determines if the run/crank relay 70 is active or operational at decision diamond 274. If the run/crank relay 70 is not active at the decision diamond 274, then the service technician can check to see if the BCM and PEPS module wires to the run/crank relay 70 are faulty, can check whether the run/crank relay 70 itself is working, can check the input wires to the ECM 18, etc. at box 276. If the run/crank relay 70 is operating properly at the decision diamond 274, the process can determine whether the theft deterrent analysis has failed at decision diamond 278, and if so, the process can check for any cause relating to this failure at box 280. These checks can include observing any related DTCs including an incorrect immobilization key from the ECM 18, no response from the BCM 16 to the challenge sent to the BCM 16 by the ECM 18, the BCM 16 has not programmed the secrete challenge key, all of the authentication codes from the slave modules 24 and 26 are not valid, there has been no request from the ECM 18 for a challenge, etc.

If the vehicle theft deterrent analysis has not failed at the decision diamond 278, then the process can determine whether the engine 28 has shut down at decision diamond 282, and if so, can check for corresponding DTCs to identify the failure at box 284. If the process determines that the engine 28 has not been shut down at the decision diamond 282, the process can then determine whether there is a starter control relay short at decision diamond 286. If the ECM 18 determines that there is a starter control relay short, it will shut the engine starting sequence down. If this occurs, the technician can check for wire short faults in the relay 98 and associated DTCs at box 288. If there is not a starter control relay short at the decision diamond 286, the process can then look for new conditions at decision diamond 290, and if such conditions are present, perform whatever checks are available for those conditions at box 292. If there are no new conditions at the decision diamond 290, the process determines that there is no specific root cause recorded by the embedded starting diagnosis for an engine stall, and the service technician can check the battery 102, the ECM 18, all power and ground connections, etc. at box 294, and the process ends at box 296.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:
1. A method comprising:
 determining, using a plurality of vehicle subsystem control modules including respective processors, said control modules being in communication with each other and receiving signals from at least a vehicle communications bus and vehicle sensors, that a no engine crank condition has occurred if the switch is pressed and the brake is applied, and if so, performing a no crank diagnosis;
 determining, using the respective processors in the control modules, that a starter control relay has not been enabled after the system is in a crank power mode, and if so, performing a starter control relay not-enabled diagnosis, and recording at least one first indication of error within a first vehicle subsystem control module of the vehicle subsystem control modules;
 determining, using the respective processors in the control modules, that the starter control relay has been disabled before the engine begins to run, and if so, performing a starter control relay disabled diagnosis, and recording at least one second indication of error within the first vehicle subsystem control module;
 determining, using the respective processors in the control modules, that the engine has stalled within a defined threshold time after being started, and if so, performing an engine stall diagnosis; and
 switching the vehicle to a run power mode when the engine is started and no faults have been detected.
2. The method according to claim 1 wherein performing each of a no crank diagnosis, a starter control relay not-enabled diagnosis, a starter control relay disabled diagnosis and an engine stall diagnosis includes reading diagnostic trouble codes (DTCs), parameter identification (PID) values, signal values stored in an electronic control unit memory and signal bus messages.

3. The method according to claim 1 wherein performing each of a no crank diagnosis, a starter control relay not-enabled diagnosis, a starter control relay disabled diagnosis and an engine stall diagnosis includes checking a vehicle battery, checking an electronic control module (ECM), and checking power and ground connections.

4. The method according to claim 1 wherein performing a no crank diagnosis includes determining whether a body control module (SCM) does not identify that the brake has been applied, but an electronic control module (ECM) does detect that the brake has been applied, and if so, checking for brake apply sensor loose wires and any associated diagnostic trouble code (DTC).

5. The method according to claim 1 wherein performing a no crank diagnosis includes determining whether a fob has been detected and validated, and if not, checking to determine if a challenge from a passive entry passive start (PEPS) module has been received by a body control module (SCM), if not checking for signal bus failure and PEPS module faults and associated diagnostic trouble codes (DTCs), otherwise checking for low frequency antenna wire failures on a low frequency communications link, checking that the fob is working properly, checking an RF receiver or wire faults on an RF communications link, and/or checking for SCM faults and associated DTCs and parameter identification (PID) values.

6. The method according to claim 1 wherein performing a no crank diagnosis includes determining whether a steering column has been unlocked, and if not, performing at least one of checking for diagnostic trouble codes (DTCs) for wire failure or hardware lock failure, checking DTCs for relay or coil faults, checking DTCs for electrical steering column lock module failure, or checking DTCs for fault of a feedback circuit to a body control module (BCM).

7. The method according to claim 1 wherein performing a no crank diagnosis includes at least one of determining that a body control module (BCM) has failed, and if so, checking the BCM, or checking power and ground connections to the BCM.

8. The method according to claim 1 wherein performing a starter control relay not-enabled diagnosis includes determining whether a crank relay has been activated, and if not, performing at least one of checking whether body control module (BCM) and passive entry passive start (PEPS) module wires to the crank relay are faulty, checking the crank relay, or checking relay input wires to an electronic control module (ECM).

9. The method according to claim 1 wherein performing the starter control relay not-enabled diagnosis includes determining whether the vehicle is in gear during the start, and if so, checking for gear sensor or circuit faults and associated diagnostic trouble codes (DTCs) and parameter identification (PID) values.

10. The method according to claim 1 wherein performing a starter control relay not-enabled diagnosis includes determining whether a vehicle theft deterrent operation has failed, and if so, performing at least one of checking for theft deterrent diagnostic trouble codes (DTCs), checking for an incorrect pre-release password, checking for an incorrect immobilization key, checking for a no response from a body control module (BCM), checking whether a secret key has been programmed, checking for slave module identification failure, checking for a no challenge request from an electronic control module (ECM), or checking for an incorrect immobilization identification from slave modules.

11. The method according to claim 1 wherein performing a starter control relay not-enabled diagnosis includes determining that the engine has been shut down, and if so, checking for corresponding diagnostic trouble codes (DTCs).

12. The method according to claim 1 wherein performing a starter control relay not-enabled diagnosis includes determining that a selective catalytic reduction (SCR) warning is active, and if so, checking an SCR warning device and any associated diagnostic trouble codes (DTCs).

13. The method according to claim 1 wherein performing a starter control relay disabled diagnosis includes determining whether the vehicle is in gear during the start, and if so, checking for gear sensor or circuit faults and associated diagnostic trouble codes (DTCs) and parameter identification (PID) values.

14. The method according to claim 1 wherein performing a starter control relay disabled diagnosis includes determining that there is no engine rotation after a predetermined minimum engine crank time, and if so, checking for diagnostic trouble codes (DTCs) for starter control or relay circuit faults, and/or checking a starter relay motor and solenoid.

15. The method according to claim 1 wherein performing a starter control relay disabled diagnosis includes determining that the engine has been shut down, and if so, checking for corresponding diagnostic trouble codes (DTCs) to identify failures.

16. The method according to claim 1 wherein performing a starter control relay disabled diagnosis includes determining that an ignition input power mode is not in a crank power mode after a minimum crank time, and if so, performing at least one of checking for body control module (BCM) and passive entry passive start (PEPS) module wires to a crank relay, checking the crank relay, or checking input wires to an electronic control module (ECM).

17. The method according to claim 1 wherein performing a starter control relay disabled diagnosis includes determining whether a vehicle theft deterrent operation has failed, and if so, performing at least one of checking for theft deterrent diagnostic trouble codes (DTCs), checking for an incorrect pre-release password, checking for an incorrect immobilization key, checking for a no response from a body control module (BCM), checking whether a secret key has been programmed, checking for slave module identification failure, checking for a no challenge request from an electronic control module (ECM), or checking for an incorrect immobilization identification from slave modules.

18. The method according to claim 1 wherein performing a starter control relay disabled diagnosis includes determining whether an accessory wake up has been activated after a predetermined cranking period, and if so, performing at least one of checking for a diagnostic trouble code (DTC) wire short, checking a passive entry passive start (PEPS) module, or checking a body control module (BCM).

19. The method according to claim 1 wherein performing a starter control relay disabled diagnosis includes determining whether an engine crank request is not confirmed after an extended engine cranking period, and if so, performing at least one of checking whether a crank power mode is active, checking for CAN bus and electronic control module (ECM) faults, checking whether the switch has been pressed, or checking for body control module (BCM) faults.

20. The method according to claim 1 wherein performing a starter control relay disabled diagnosis includes determining whether engine cranking has occurred for a maximum crank time without the engine starting, and if so, checking at least one of the starter system, a fuel system, an engine system or a vehicle battery.

21. The method according to claim 1 wherein performing an engine stall diagnosis includes determining whether a run crank relay is inactive, and if not, performing at least one of checking whether a body control module (BCM) and passive entry passive start (PEPS) module wires to a crank relay are faulty, checking the crank relay, or checking relay input wires to an electronic control module (ECM).

22. The method according to claim 1 wherein performing an engine stall diagnosis includes determining whether a vehicle theft deterrent operation has failed, and if so, performing at least one of checking for theft deterrent diagnostic trouble codes (DTCs), checking for an incorrect immobilization key, checking for a no response from a body control module (SCM), checking whether a secret key has been programmed, checking for slave module identification failure, checking for a no challenge request from an electronic control module (ECM), or checking for an incorrect immobilization identification from slave modules.

23. The method according to claim 1 wherein performing an engine stall diagnosis includes determining that the engine has been shut down, and if so, checking for corresponding diagnostic trouble codes (DTCs) to identify failures.

24. The method according to claim 1 wherein performing an engine stall diagnosis includes determining whether a starter control relay has an electrical short, and if so, checking for wire short faults and associated diagnostic trouble codes (DTCs).

25. A method for diagnosing a no-start failure of a vehicle push-button start system for a vehicle engine that includes a push-button switch, said method comprising determining, using a plurality of vehicle subsystem control modules each including a processor, said control modules being in communication with each other and receiving signals from other controllers, a vehicle communications bus and vehicle sensors, that one or more fault conditions have occurred, where the fault conditions include a no engine crank condition, a starter control relay not enabled, the starter control relay disabled before the engine is running, and the engine stalled within some minimum time after being started, and further comprising switching the vehicle to a run power mode when the engine is running and none of the fault conditions have occurred.

26. The method according to claim 25 wherein determining that one or more of a no engine crank condition, a starter control relay has not been enabled, the starter control relay has been disabled before the engine is running, and the engine has stalled within some minimum time after being started has occurred includes reading diagnostic trouble codes (DTCs), parameter identification (PID) values, signal values stored in an electronic control unit memory and signal bus messages.

27. The method according to claim 25 wherein determining that one or more of a no engine crank condition, a starter control relay has not been enabled, the starter control relay has been disabled before the engine is running, and the engine has stalled within some minimum time after being started has occurred includes checking a vehicle battery, checking an electronic control module (ECM), and checking power and ground connections.

28. A method comprising:
determining in order until the failure has been identified, using a plurality of vehicle subsystem control modules each including a processor, said control modules being in communication with each other and receiving signals from at least a vehicle communications bus and vehicle sensors, that a no engine crank condition has occurred, a starter control relay has not been enabled, the starter control relay has been disabled before the engine is running, and the engine has stalled within some minimum time after being started;
recording at least one first indication of error within a first vehicle subsystem control module of the plurality of vehicle subsystem control modules; and
switching the vehicle to a run power mode when the engine is running and the failure has not been identified.

* * * * *